(12) United States Patent
Cammas et al.

(10) Patent No.: US 9,338,466 B2
(45) Date of Patent: May 10, 2016

(54) METHOD AND DEVICE FOR CODING AN IMAGE SEQUENCE IMPLEMENTING BLOCKS OF DIFFERENT SIZE, SIGNAL, DATA MEDIUM, DECODING METHOD AND DEVICE, AND COMPUTER PROGRAMS CORRESPONDING THERETO

(75) Inventors: Nathalie Cammas, Sens de Bretagne (FR); Stéphane Pateux, Rennes (FR); Isabelle Amonou, Cesson-Servigne (FR); Sylvain Kervadec, Sens de Bretagne (FR)

(73) Assignee: FRANCE TELECOM, Paris (FR)

( * ) Notice: Subject to any disclaimer, the term of this patent is extended or adjusted under 35 U.S.C. 154(b) by 1007 days.

(21) Appl. No.: 13/124,517

(22) PCT Filed: Oct. 13, 2009

(86) PCT No.: PCT/FR2009/051947
§ 371 (c)(1),
(2), (4) Date: Jul. 11, 2011

(87) PCT Pub. No.: WO2010/043811
PCT Pub. Date: Apr. 22, 2010

(65) Prior Publication Data
US 2011/0261888 A1    Oct. 27, 2011

(30) Foreign Application Priority Data

Oct. 15, 2008  (FR) ...................................... 08 56973

(51) Int. Cl.
*H04N 7/26*   (2006.01)
*H04N 19/33*  (2014.01)
(Continued)

(52) U.S. Cl.
CPC ............. *H04N 19/33* (2014.11); *H04N 19/103* (2014.11); *H04N 19/147* (2014.11);
(Continued)

(58) Field of Classification Search
CPC ............................................... H04N 19/00272
See application file for complete search history.

(56) References Cited

U.S. PATENT DOCUMENTS

2011/0007977 A1   1/2011   Amonou et al.

FOREIGN PATENT DOCUMENTS

WO       2006/087314 A1   8/2006
WO    WO 2008/027192      3/2008
(Continued)

OTHER PUBLICATIONS

Davy De Schrijver et al. "XML-based Exploitation of Region of Interest Scalability in Scalable Video Coding," IEEE Eighth International Workshop on Image Analysis for Multimedia Interactive Services, 2007, WIAMIS 2007, Jun. 1, 2007, ISBN: 978-0-7695-2818-2.*

(Continued)

*Primary Examiner* — Andy Rao
*Assistant Examiner* — Tyler Edwards
(74) *Attorney, Agent, or Firm* — David D. Brush; Westman, Champlin & Koehler, P.A.

(57) ABSTRACT

A method is provided for coding an image sequence, including splitting a current image into blocks of standard size, termed macroblocks. For at least one current macroblock of the current image, the method further includes: constructing at least one block of greater size than the current macroblock, termed a large block, which includes the current macroblock and at least one neighbor macroblock in the current image, taking account of characteristics of the current image; coding the large block, delivering base coding information, making it possible to reconstruct a base layer of said current image, and for at least one large block, determining enhancement information associated with at least one macroblock present in the large block.

13 Claims, 3 Drawing Sheets

(51) Int. Cl.

| | |
|---|---|
| *H04N 19/176* | (2014.01) |
| *H04N 19/70* | (2014.01) |
| *H04N 19/147* | (2014.01) |
| *H04N 19/46* | (2014.01) |
| *H04N 19/61* | (2014.01) |
| *H04N 19/593* | (2014.01) |
| *H04N 19/103* | (2014.01) |
| *H04N 19/174* | (2014.01) |

(52) U.S. Cl.
CPC .......... *H04N 19/174* (2014.11); *H04N 19/176* (2014.11); *H04N 19/46* (2014.11); *H04N 19/593* (2014.11); *H04N 19/61* (2014.11); *H04N 19/70* (2014.11)

(56) References Cited

FOREIGN PATENT DOCUMENTS

| | | | |
|---|---|---|---|
| WO | WO 2008027192 A2 * | 3/2008 | |
| WO | 2009112742 A1 | 9/2009 | |

OTHER PUBLICATIONS

Siwei Ma et al.—"High Definition Video Coding with Super-macroblocks" Proc. SPIE, vol. 6508, no. 650816, Jan. 29, 2007, XP002538135.*

Davy De Schrijver et al. "XML-based Exploitation of Region of Interest Scalability in Scalable Video Coding," IEEE Eighth International Workshop on Image Analysis for Multimedia Interactive Services, 2007. WIAMIS 2007, Jun. 1, 2007, ISBN: 978-0-7695-2818-2.*

English translation of the International Preliminary Report on Patentability and Written Opinion for correspinding International application PCT/FR2009/051947 dated May 10, 2011.

French Search Report and Written Opinion for corresponding French patent application No. FR0856973 dated Jul. 22, 2009.

Davy De Schrijver et al: "XML-based Exploitation of Region of Interest Scalability in Scalable Video Coding" IEEE Eighth International workshop on Image Analysis for Multimedia Interactive Services, 2007, WIAMIS 2007, Jun. 1, 2007, pp. 56-59, XP031119843, ISBN: 978-0-7695-2818-2.

Siwei Ma et al: "High-definition Video Coding with Super-macroblockas" Proc. SPIE, vol. 6508, No. 650816, Jan. 29, 2007, pp. 1-12, XP002538135.

Qiang Hao et al: "Macroblock-level Reduced Resolution Video Coding Allowing Adaptive DCT Coefficients Selection" IEEE International Symposium on Circuits and Systems, ISCAS 2007, May 1, 2007, pp. 529-532, XP031181314 ISBN: 978-1-4244-0920-4.

Schwarz H et al: "Overview of the Scalable Video Coding Extension of the H.264/AVC Standard" IEEE Transactions on Circuits and Systems for Video Technology, IEEE Service Center, Piscataway, NJ, US, vol. 17, No. 9, Sep. 1, 2007, pp. 1103-1120, XP011193019 ISSN: 1051-8215.

Aurelie Martin et al: "Atomic decomposition dedicated to AVC and spatial SVC prediction" 15th IEEE International Conference in Image Processing, ICIP 2008, IEEE, Piscataway, NJ, US, 12 Oct. 12, 2008, pp. 2492-2495, XP031374546 ISBN: 978-1-4244-1765-0.

Cixun Zhang et al: "Video coding using pruned transforms and interleaving of multiple block" Acoustics, Speech and Signal Processing, 2008. ICASSP 2008. IEEE International Conference on, IEEE, Piscataway, NJ, USA, Mar. 31, 2008, pp. 1049-1052, XP031250735

Naito S et al: "Efficient coding scheme for super high definition video based on extending H.264 high profile" Proc. Spie Visual Communications and Image Processing, vol. 6077, No. 067727, Jan. 18, 2006, pp. 1-8, XP002538136.

Tourapis, A, J. Boyce: "Reduced Resolution Update Mode extension to the H-264 Standard" DoCoMo USA Labs, San Jose, CA 95110, USA, Thompson Corporate Research, Princeton, NJ 08540, USA, IEEE 2005.

English Translation of first Chinese Office Action for corresponding Chinese Patent Application No. 200980141550.2, filed Oct. 13, 2009.

Office Action from the European Patent Office for corresponding European Patent Application No. 09756014.8, dated Oct. 8, 2012.

* cited by examiner

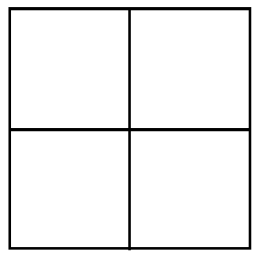
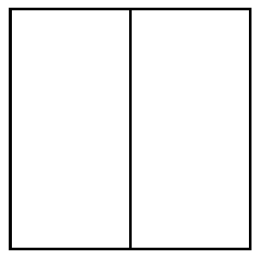
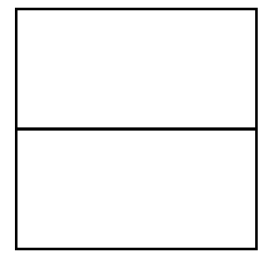
Fig. 3A          Fig. 3B          Fig. 3C
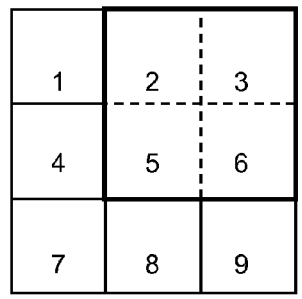
Fig. 4
| MB16x16 (1) | MB32x32 (2) | MB16x16 (4) | MB16x16 (7) | MB16x16 (8) | MB16x16 (9) |
Fig. 5
| MB16x16 (1) | MB32x32 (2) | MB16x16_E (2) | MB16x16_E (3) |
| MB16x16 (4) | MB16x16_E (5) | MB16x16_E (6) | |
| MB16x16 (7) | MB16x16 (8) | MB16x16 (9) | |
Fig. 6

METHOD AND DEVICE FOR CODING AN IMAGE SEQUENCE IMPLEMENTING BLOCKS OF DIFFERENT SIZE, SIGNAL, DATA MEDIUM, DECODING METHOD AND DEVICE, AND COMPUTER PROGRAMS CORRESPONDING THERETO

CROSS-REFERENCE TO RELATED APPLICATIONS

This application is a Section 371 National Stage application of International Application No. PCT/FR2009/051947, filed Oct. 13, 2009 and published as WO 2010/043811 on Apr. 22, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the encoding and decoding of a video stream formed by a series of successive images. More specifically the disclosure pertains to the compression of images or image sequences using block transforms.

The disclosure can be applied especially to video encoding implemented in current video encoders (MPEG, H.264, etc) or future video encoders (H.265).

BACKGROUND OF THE DISCLOSURE

There already exist many known video data compression techniques. These include numerous video encoding techniques that use a blockwise representation of the video sequence such as for example techniques implementing video compression standards laid down by the MPEG organization (MPEG-1, MPEG-2, MPEG-4 part 2, etc) or the ITU-T (H.261 . . . H.264/AVC) standards. Thus, in the H.264 technique, each image can be divided into slices which are themselves divided into macroblocks which are then sub-divided into blocks. A block is constituted by a set of pixels. According to the H.264 standard, a macroblock is a square block with a size equal to 16×16 pixels which can be divided again into blocks sized 8×8, 16×8 or 8×16, the 8×8 blocks being then capable of being re-divided into blocks sized 4×4, 8×4 or 4×8.

According to the prior art techniques, the macroblocks or the blocks can be encoded by intra-image or inter-image prediction. In other words, a macroblock or block can be encoded by:
  temporal prediction, i.e. with reference to a reference block or macroblock belonging to one or more other images; and/or
  a prediction known as a "spatial" prediction as a function of blocks or macroblocks neighboring the current image.

In the latter case, the prediction can be done only on the basis of blocks which have been previously encoded.

More specifically, according to the H.264 technique, images I are encoded by spatial prediction (intra prediction) and images P and B are encoded by temporal prediction relatively to other images I, P or B encoded/decoded by means of motion compensation.

In order to be encoded, these images are sub-divided into blocks. For each block there is encoded a residual block also called a prediction residue corresponding to the original block minus a prediction. The coefficients of this block are quantified after a possible transformation and then encoded by an entropic encoder.

According to the H.264 technique for example, the following are encoded for each block:
  the type of encoding (intra prediction, inter prediction, prediction skip);
  the type of partitioning;
  information on prediction (orientation, reference image, etc);
  motion information if necessary;
  the encoded coefficients;
  etc.

The decoding is done image by image, and for each image it is done macroblock by macroblock. For each macroblock, the corresponding elements of the stream are read, and the inverse quantification and the inverse transform of the coefficients of the blocks of the macroblock are done. Then, the prediction of the macroblock is computed and the macroblock is rebuilt by adding the prediction to the decoded prediction residue.

With the coming of new high-resolution video formats, the size of the blocks used in current-day video compression standards is unfortunately no longer suited to the content of the video sequences to be compressed.

Furthermore, the various types of prediction possible in the AVC encoder are not the same depending on the size of the blocks. For example, in intra encoding, it is not possible to benefit from as many directions of prediction for a block sized 16×16 as for a block sized 4×4. Now, the use of 4×4 sized blocks to encode a high-resolution sequence cannot be used to efficiently exploit the signal to be compressed since the quantity of information contained in the block is not sufficiently representative of the high-resolution sequence for the encoding applied to be efficient in terms of bit-rate/distortion costs.

Furthermore, the maximum size of the blocks for the prediction is limited to 16×16 in current-day video compression standards. Now the use of bigger-sized blocks may have some utility in the case of high-resolution sequences.

The document by A. Tourapis, J. Boyce, "*Reduced Resolution Update Mode Extension to the H.264 Standard*" proposes to extend the encoding technique known as "Reduced Resolution Update" or RRU to H.264 encoding.

To encode a block, the RRU technique makes the prediction and computation of the prediction residues of the block at the resolution of the block. Then the block is sub-sampled. The sub-sampled coefficients are transformed, quantified and encoded by an entropic encoder. At the time of decoding, the coefficients are decoded, the inverse quantification and transformation are performed and then a step of oversampling the coefficients is applied in order to rebuild the block at its initial resolution.

The extension of this RRU technique to an H.264 encoder consists of the application of the RRU technique to M×N sized blocks with M and N being multiples of 16.

Thus, in this technique, all the blocks of the image have the same size M×N which is not necessarily well suited to the content of the image.

SUMMARY

An embodiment of the invention proposes a novel solution which does not have all these prior-art drawbacks. An exemplary embodiment relates to a method for encoding a sequence of images comprising a step for sub-dividing a current image into standard-sized blocks known as macroblocks.

According to an embodiment of the invention such a method comprises, for at least one current macroblock of the current image, the following steps:

building at least one block of a size greater than said current macroblock, called a large block, comprising said current macroblock and at least one neighboring macroblock in the current image, in taking account of characteristics of said current image;

encoding said large block delivering base encoding information enabling the rebuilding of a base layer of said current image and for at least one large block, determining enhancement information associated with at least one macroblock present in said large block enabling the rebuilding of an enhancement layer of said current image.

An embodiment of the invention thus proposes a novel image encoding technique for adapting the size of the blocks to be encoded by taking account of the characteristics of the image to be encoded.

The size of the larger-sized block or blocks may be predefined during encoding as a function of the size of the image to be encoded (for example according to recommendations defined by a standard or else specified in the header of the encoded data).

For a current macroblock of the current image, one or more large blocks of a size greater than the current macroblock are then built, in taking account of conditions specific to the encoder. Then, the block that enables the best base representation for the current macroblock to be obtained is selected. For example, this selection is done by choosing the larger-sized block that makes it possible to optimize a bit-rate/distortion criterion.

More specifically, the encoding of a large block enables the computation when decoding, through the base encoding information, of a rebuilt (prediction) value for all the pixels of this large block and therefore for the pixels of the current macroblock present in the large block. The term "base representation" is understood here to mean all these values rebuilt for the current macroblock.

For example, the best base representation is one that minimizes $R+\lambda D$ with R being the bit rate associated with the encoding of the prediction residue and of the pieces of signaling information needed for the prediction mode in question, D is the distortion of the large block after rebuilding (with the addition of residue decoded at prediction), and $\lambda$ is a predetermined Lagrange value.

Here below, the choice of the size of the block to be encoded in the base representation (i.e. the current macroblock, or else the higher-sized block) is also based on a bit-rate-distortion criterion for example. For the size of the block considered, we define the value of the mean bit-rate by pixel $Rp=R/size\_block$ and the mean distortion by pixel Dp, and the Lagrange value $Rp+\lambda Dp$ is associated with the block considered. The chosen block size is then the one corresponding to the tested block having the lowest Lagrange value.

The large block is then encoded so as to obtain base encoding information for this large block. The pieces of base encoding information for the large block are then inserted into a signal representing the image and/or are stored. Using the AVC terminology, these base encoding information elements enable the rebuilding of a base layer of the image, i.e. a version with a first level of quality of the current image (base representation).

For at least one large block, it is then possible to determine enhancement information associated with at least one macroblock present in the large block. In using the SVC terminology, these pieces of enhancement information enable the rebuilding of an enhancement layer of the image, i.e. a greater quality version of the current image.

For example, the enhancement information include information on texture and/or motion.

The blocks of a size greater than the macroblock are for example built so as to cover several neighboring macroblocks horizontally and/or vertically with respect to the current macroblock, corresponding to a region of the image that has similar characteristics, such as a same value of motion or a homogenous texture.

Thus, the current image (or a portion of the image) is scanned macroblock by macroblock in a predetermined sense of scanning and, for each new macroblock, new blocks greater in size than this macroblock are built, and it is sought to determine whether the best base representation for the current macroblock is obtained by encoding the macroblock directly or by encoding one of the bigger-sized blocks. The scanning directions are for example line by line scans, generally known as the raster scan, or spiral scan in which it is proposed to scan a group of blocks from its center in going towards the edges in a spiral-shaped path.

In particular, the method of an embodiment of the invention comprises a preliminary step for checking to see if the current macroblock has been previously encoded in a large block containing the current macroblock and in the event of a positive check, passing to a following macroblock in a predetermined scanning order.

In other words, during a scanning of an image macroblock by macroblock, it is possible to skip a macroblock if base encoding information has already been determined for this macroblock. It is also possible to determine enhancement information for this current macroblock. Thus, if the current macroblock belongs to a large block for which there is already base encoding information available, it is not necessary to encode base information for this current macroblock (the encoding of enhancement information being possible), and it is possible to pass to the next macroblock.

An embodiment of the invention thus makes it possible to adapt the size of the blocks to the image and to the desired level of resolution in storing and/or transmitting base encoding information associated with a macroblock for regions showing fine details or base encoding information associated with a large block for regions showing coarser details.

According to one particular aspect of an embodiment of the invention, the method comprises a step of insertion, into a signal representing the image sequence, of at least one flag belonging to a group comprising:

a flag signaling the presence of at least one large block;

a flag signaling the presence of enhancement information associated with at least one macroblock present in said large block.

It is possible in this way to transmit base encoding information and enhancement information in a signal having only one layer.

The proposed syntax does away with the use of a stream having a hierarchical structure of data layers as proposed according to the SVC technique.

In particular, the encoding method comprises a step for inserting the following pieces of information into the signal, in a predetermined order of scanning of the macroblocks in the image:

base encoding information associated with at least one macroblock;

base encoding information associated with at least one large block;

enhancement information associated with at least one macroblock present in a large block.

Thus, for certain macroblocks of the image, the best base representation is obtained by individually encoding the macroblock whereas for others, the best base representation is obtained by encoding a large block comprising the macroblock.

According to this exemplary embodiment, the signal generated by the encoder and intended for a receiver comprises base encoding information associated with one or more individually encoded macroblocks and pieces of base encoding information associated with one or more large blocks.

The signal also comprises enhancement information associated with one or more macroblocks present in a large block and possibly one or more macroblocks taken individually.

In another embodiment, the invention pertains to a device for encoding a sequence of images comprising means for sub-dividing a current image into standard-sized blocks known as macroblocks.

According to an embodiment of the invention, such a device comprises, for at least one current macroblock of the current image:

means for building at least one block of a size greater than said current macroblock, called a large block, comprising said current macroblock and at least one neighboring macroblock in the current image, in taking account of characteristics of said current image;

means for encoding said large block, delivering base encoding information enabling the rebuilding of a base layer of said current image and for at least one large block, means for determining enhancement information associated with at least one macroblock present in said large block enabling the rebuilding of an enhancement layer of said current image.

Such an encoding device is especially suited to implementing the encoding method described here above. It is, for example, an MPEG or H.264 type encoder or an encoder according to a future standard of video compression.

Another aspect of an embodiment of the invention pertains to a signal representing a sequence of images encoded according to the encoding method described here above.

Such a signal comprises:

base encoding information associated with at least one large block, enabling the rebuilding of a base layer of said current image; and enhancement information associated with at least one macroblock present in one of said large blocks, enabling the rebuilding of an enhancement layer of said current image.

This signal can be transmitted and/or stored on a data carrier.

This signal could of course include the various characteristics pertaining to the encoding method of an embodiment of the invention.

In particular, this signal comprises at least one flag belonging to a group comprising:

a flag signaling the presence of at least one large block;

a flag signaling the presence of enhancement information associated with at least one macroblock present in said large block.

Yet another aspect of an embodiment of the invention pertains to a data carrier comprising at least one signal representing a sequence of images encoded according to the encoding method described here above.

Such a carrier comprises:

base encoding information associated with at least one large block, enabling the rebuilding of a base layer of said current image; and enhancement information associated with at least one macroblock present in one of said large blocks, enabling the rebuilding of an enhancement layer of said current image.

It is especially adapted to carrying a signal as described here above.

In another embodiment, the invention pertains to a method for decoding a signal representing a sequence of images, an image being sub-divided into standard-sized blocks known as macroblocks, said signal comprising:

base encoding information associated with at least one large block, enabling the rebuilding of a base layer of said current image; a large block corresponding to a group of macroblocks built in taking account of features of said current image; and enhancement information associated with at least one macroblock present in one of said large blocks, enabling the rebuilding of an enhancement layer of said current image.

According to an embodiment of the invention, such a method implements the following steps:

reading base encoding information associated with a large block;

decoding base encoding information and rebuilding the large block;

decoding enhancement information associated with at least one macroblock present in said large block, (if these pieces of information exist) and refining said at least one macroblock.

In this way, the decoding technique of an embodiment of the invention enables the rebuilding, upon reception and reading of the base encoding information, of a region of the image corresponding to a large block, i.e. combining several macroblocks.

In particular, the signal may also carry base encoding information associated with at least one macroblock.

In this case, the decoding method implements steps for reading base encoding information associated with at least one macroblock, decoding base encoding information associated with a macroblock and rebuilding the corresponding macroblock.

In this way, the decoding technique of an embodiment of the invention enables the rebuilding of either a region of the image corresponding to a macroblock or a region of the image corresponding to a large block, i.e. grouping together several macroblocks.

According to one particular aspect, the decoding method comprises a step for rebuilding a macroblock out of at least one macroblock present in the previously rebuilt large block.

It is thus possible to rebuild a current macroblock by taking account of previously rebuilt macroblocks localized in a causal or anti-causal zone of the current macroblock.

The causal zone of a macroblock is the zone of the image comprising the macroblocks situated before the current macroblock, in the scanning order of the blocks in the image. The anti-causal zone of a macroblock is the zone of the image comprising the macroblock situated after the current macroblock, in the scanning order of the blocks in the image.

According to one particular characteristic, the refining is done according to a predetermined order of scanning of the macroblocks.

Thus the refining of the macroblocks is not necessarily implemented for all the macroblocks present in a large block, once this large block is decoded. This refining can be implemented in a predetermined order of scanning the macroblocks such as the raster scan or spiral scan direction as described here above.

In another embodiment, the invention pertains to a device for decoding a signal representing a sequence of images comprising:

means for reading base encoding information associated with a large block;

means for decoding said base encoding information and rebuilding said large block;

means for decoding enhancement information associated with at least one macroblock present in said large block, if such information exists, and for refining said at least one macroblock.

Such an decoding device is especially suited to implementing the encoding method described here above. It is, for example, an MPEG or H.264 type decoder or a decoder according to a future standard of video compression.

An embodiment of the invention also pertains to a computer program comprising instructions for the implementation of the encoding method and/or of the decoding method described here above when this program is executed by processor or a computer program product downloadable from a communications network and/or stored on a computer-readable carrier and/or executable by a processor, comprising program code instructions for the implementation of the encoding method and/or of the decoding method described here above when this program is executed by processor.

BRIEF DESCRIPTION OF THE DRAWINGS

Other features and advantages shall appear from the following description of a particular embodiment, given by way of an indicative and non-exhaustive example and from the appended drawings, of which

FIGS. 3A to 3C present different possible partitions for a same block;

FIG. 4 illustrates the encoding of macroblocks or large blocks according to one embodiment of the invention;

FIGS. 5 and 6 represent the syntax of a stream according to one embodiment of the invention;

DETAILED DESCRIPTION OF ILLUSTRATIVE EMBODIMENTS

1. General Principle

The general principle of an embodiment of the invention relies on the use of blocks of a size that can be adapted according to the characteristics of the region of an image to be encoded. It is thus possible to define regions for which a large-sized block is encoded and others for which a small-sized block is encoded.

Indeed, the inventors of the present patent application have noted that in the homogenous regions of a video, a large-sized block (for example 32×32 pixels or more) enables the main characteristics of the region to be captured by minimizing the syntax cost associated with the encoding of this region. Similarly, the step of transformation on a larger carrier provides for better energy compaction. However, the use of small-sized blocks or medium-sized blocks remains necessary in the non-homogenous zones.

The term "homogenous region" is understood to mean a region with a same texture or a same motion for example. Thus, a homogenous zone as understood in terms of motion or texture is a zone for which the pixels have proximate characteristics.

An embodiment of the invention therefore proposes a novel approach for adapting the size of a block to the region of the image to which it corresponds. Furthermore, when several macroblocks are grouped together to form a large block, this large block is encoded at two levels:

a first level enabling to determine base encoding information associated with the large block;

a second level enabling to determine enhancement information associated with at least one macroblock of the large block.

Figure 1:
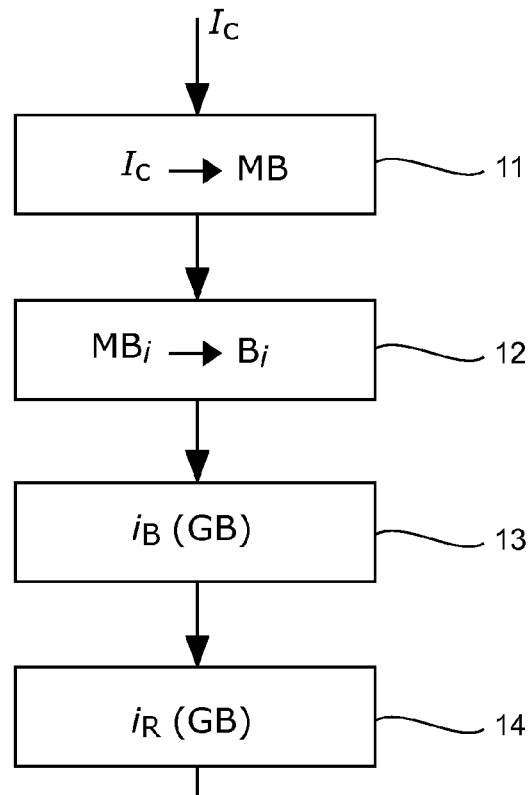
FIG. 1 illustrates the main steps of a method of encoding according to one embodiment of the invention.

FIG. 1 provides a more precise illustration of the encoding steps according to an embodiment of the invention.

More specifically, a current image $I_c$ is sub-divided during a first step 11 into standard-sized blocks known as macroblocks.

For example, according to the H.264/AVC standard, a macroblock is a square block sized 16×16. In future standards, a macroblock could have a size equal to 32×32, 64×64 or 16×32 for example.

Figure 2A:
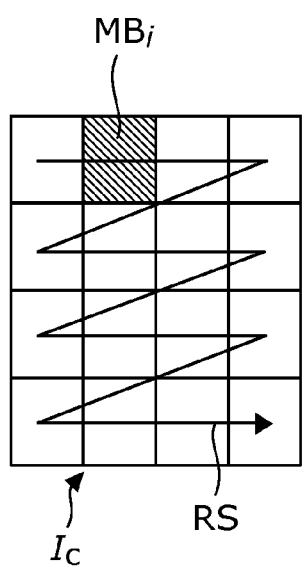
FIGS. 2A and 2B illustrate a sense of scanning of the macroblocks in an image and the building of a large block.

It is deemed to be the case that the current image $I_c$ is scanned macroblock by macroblock in the Raster Scan direction as illustrated by the arrow RS in FIG. 2A.

For at least one macroblock of the current image $I_c$, denoted as $MB_i$, the method implements a building step 12 for building at least one block $B_i$ having a size greater than that of the current macroblock $MB_i$ comprising the current macroblock $MB_i$ and at least one neighboring macroblock in the image $I_c$. Such blocks therefore have a size greater than that of the 16×16 macroblocks according to the H.264/AVC standard. For example, we build a first block $B_1$ sized 16×32, a second block $B_2$ sized 32×16, a third block $B_3$ sized 32×32.

The neighboring macroblocks may be chosen in the anti-causal zone of the current macroblock $MB_i$, i.e. in the zone of the image comprising the macroblocks situated after the macroblock $MB_i$, along the scanning direction RS of the macroblocks in the image. It is thus ensured that each macroblock is encoded only once.

The possible sizes for these large blocks are predefined as a function of the size of the images to be encoded (according to a recommendation defined by a standard or else specified as a header of the encoding data).

If several large blocks are built for the macroblock, one of them is selected as explained here below.

Figure 2B:
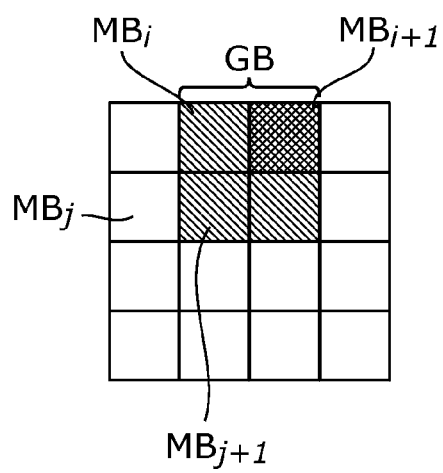

For example, it is considered to be the case that it is the block $B_3$ sized 32×32 that gives the best value of rebuilding for the zone considered, i.e. the best base representation. This block, called a large block GB here below, is illustrated in FIG. 2B.

This large block is encoded during an encoding step 13 so as to obtain base encoding information $i_B$ associated with the large block. This base encoding information includes at least one piece of information from among the following:

information on the encoding mode used (intra mode, inter mode);

information on possible sub-division of the large block (partitioning);

prediction information (motion for inter encoding, mode of intra prediction in intra mode), and prediction residue.

Then, during a subsequent step 14, enhancement information are determined for at least one macroblock present in a large block. For example, enhancement information is determined for the macroblock $MB_{i+1}$ present in the large block GB.

As indicated here above, the selection of a large block from among the set of blocks provides for a better base representation for the region concerned.

For example, a region sized 32×32 can be represented by:
two large blocks sized 16×32, or
two large blocks sized 32×16, or
one large block sized 32×32, or
four blocks sized 16×16, these blocks being classically predicted as a macroblock MBi.

A base representation is determined for each of the blocks and the different base representations of the regions sized 32×32 are compared with one another:
the two large blocks sized 16×32;
the two large blocks sized 32×16;
the large block sized 32×32; and
the four blocks sized 16×16.

Indeed, it is necessary to compare (bit-rate/distortion criterion) the base representations on a same zone (with the same number of rebuilt pixels), because the cost of encoding associated with the prediction mode for a macroblock MBi encoded by a large block can sometimes be difficult to compute if the bit-rate/distortion criterion is compared for the pixels of the macroblock MBi alone, whereas a bigger region has been encoded.

If the best base representation for the 32×32 region is given by the four blocks sized 16×16 then only the current macroblock MBi is encoded. If the best representation for the 32×32 region is given by the two large horizontal or vertical blocks, then the large block containing the current macroblock MBi is encoded. If the best representation for the 32×32 region is given by the large block sized 32×32 then the large block sized 32×32 is encoded.

The encoding method according to an embodiment of the invention can be implemented in various ways especially in wired form or software form.

2. Detailed Description of the Encoding Method

Here below, we present a particular embodiment of the encoding method according to an embodiment of the invention. The size of a large block is considered to have been already fixed.

A) Encoding with Partitioning of the Large Block

In order to determine the best base representation for a current macroblock, we determine several base representations (or first-level encoded versions) for built blocks of a size greater than the current macroblock. These different representations are determined as a function of different partitions of the larger-sized blocks.

Thus, for the encoding of a large block, different kinds of partitioning can be used, such as horizontal rectangular, vertical rectangular or square partitioning as illustrated in FIGS. 3A to 3C.

The partitioning therefore makes it possible to obtain a set of sub-blocks which do not necessarily have the size of a macroblock. These sub-blocks can be square-shaped, rectangular-shaped or have other shapes.

In order to limit the number of partitions associated with a macroblock or a larger-sized block, it is considered for example to be partitioned by means of a dyadic sub-division technique implementing a regular sub-division of the block into two, horizontally (FIG. 3C) or vertically (FIG. 3B) or a quadtree type technique implementing a regular sub-division of the block into four blocks of identical size (FIG. 3A).

This sub-division can be implemented recursively until a sub-block with a size of 4 pixels is obtained on one of its vertical or horizontal dimensions (the smallest dimension).

For example, if a larger-sized block includes a region of white pixels and a region of black pixels, it is desirable to partition the block into two sub-blocks, one corresponding to the region of white pixels and the other corresponding to the region of black pixels and to encode the two sub-blocks independently rather than encode a mean value that does not express the contrast.

B) Modes of Prediction for the Encoding of the Large Block

The modes of prediction used to encode a block defined according to the H.264/AVC standard may be extended to these different partitions.

Thus, in the inter mode, the mechanisms defined under the AVC standard can be used for motion estimation and compensation. These mechanisms can be applied to sub-blocks having a size greater than the size of a standard macroblock (16×16 according to the AVC technique).

Depending on the partitioning used, a vector can be used to compensate entirely for the large block, or several vectors can be used for each sub-block, similarly to the AVC technique.

In the intra mode, new predictions are possible and are added to the classic predictions of the AVC technique by the addition of further orientations in the causal direction and in the anti-causal direction.

Indeed, the anti-causal prediction is possible here when neighboring macroblocks have already been encoded by means of large blocks. For example, returning to FIG. 2B, the macroblock $MB_j$ could be predicted by taking account of the next macroblock in the scanning order ($MB_{j+1}$), since this macroblock has been encoded during the step for encoding the large block.

If several base representations offer similar levels of performance, then preference is given to the one obtained from the largest-sized block. Indeed, the encoding of a large-sized block limits the quantity of base encoding information inserted into the stream (since the macroblocks present in a large block are not encoded individually in the base version) and therefore accelerates the processing at the decoding side.

C) Transformation of the Prediction Residue for the Encoding of a Large Block

Once the best base representation has been determined, the corresponding large block is encoded.

Classically, when the prediction of a block is computed, the prediction residue is transformed in order to compact the energy of the signal on a smaller number of coefficients.

With the use of a large block, the transformation used by AVC can be extended to bigger carriers. This can be done by adding a 16×16 or 32×32 integer DCT transform depending on the size of the standard macroblocks, as well as wavelet transforms.

The technique known as RRU can also be applied to the large blocks. The prediction residues are then sub-sampled and then transformed by an 8×8 or 4×4 transform for example. At the time of decoding, the reconstructed coefficients could be over-sampled before adding the prediction.

The classic 4×4 or 8×8 type transforms can also be used on the large blocks according to an embodiment of the invention.

For each large block, a piece of information specifying the type of transform performed is encoded.

If certain macroblocks are encoded individually, a piece of information specifying the type of transform performed is also encoded for these macroblocks.

D) Information on Enhancement for a Macroblock

Furthermore, for at least one macroblock of a large block, a refinement of motion can be encoded in the form of a residue computed by prediction relatively to a base motion encoded for the large block.

In the intra or inter mode, for at least one macroblock of the large block, a textural refinement can also be encoded in the form of a texture residue by prediction relatively to a base texture encoded for the large block.

E) Encoder

It is considered for example that the invention is implemented in a classic H.264 encoder.

The current image is sub-divided into blocks of standard size, called macroblocks, sized 16×16 if the description is situated in the context of an H.264 encoder. The biggest encoding unit is defined as a function of the resolution of the sequence to be encoded for example.

This maximum encoding unit is sized M×N with M and N being multiples of 16 pixels. Indeed, it corresponds to a block built from at least two macroblocks of the current image.

The scanning of the macroblocks in the image is done line by line (raster scan). The encoding of the macroblocks is determined by group of macroblocks, one group forming a large block.

For a first macroblock of the image in the raster scanning order (where the upper left hand corner is at the position (x0, y0)), it is sought to determine whether the best performance in terms of bit-rate/distortion is obtained by encoding this macroblock directly or by encoding a greater-sized block comprising this macroblock.

To this end, different sizes of blocks are tested. For example, a block sized 16×32, a block sized 32×16, a block sized 32×32 etc, are tested and for each block of a size greater than the macroblock, different partitions and different modes of prediction are tested for the encoding of this large block. The prediction modes for a partition are tested similarly to what is done in AVC, namely in the intra mode, inter mode, or "skip" mode if the block is rebuilt by simple prediction (i.e. if there is no additional information to be transmitted), as well as the different sizes of transformation.

Then, the large block that offers the best base representation for the region considered is selected.

It is considered for example that it is the large block sized M*×N* that has the best performance. The choices pertaining to this large block (in particular, its size, its partitioning and/or the type of transform used) are stored and then base encoding information associated with the large block is determined.

Base encoding information for each macroblock of the large block can also be stored to be inserted if necessary later into the stream. In particular, it is possible to determine and store enhancement information associated with the macroblock present in the large block. The encoder then passes to the next macroblock, positioned at the position (x0+M*, y0).

If the best base representation of the first macroblock is obtained from the first macroblock individually (in isolation), then the size of this block is stored and base encoding information associated with the macroblock are determined thereafter. The encoder then passes to the next macroblock, positioned at the position (x0+16, y0).

The encoder thus performs an encoding of the entire image in making a search each time for the best possible combination of macroblocks for the encoding.

The signal representing the image sequence (also called a stream) is then built by the encoding, for each macroblock of the image in a predetermined scanning direction, of the saved data of the best base representation. When the best base representation of a macroblock is obtained from a large block, the pieces of data for this large block are inserted into the stream, in the form of base encoding information associated with the large block. When the best base representation for a macroblock is obtained from the macroblock encoding taken in isolation, the pieces of data for this macroblock are inserted into the stream, in the form of base encoding information associated with the macroblock.

For example, as illustrated in FIG. 4, we consider an image (or image portion) sub-divided into nine macroblocks sized 16×16 numbered 1 to 9 in the raster scanning order. The image is scanned macroblock by macroblock.

When the current macroblock is the macroblock 1, the best base representation is deemed to be obtained from the encoding of the macroblock 1 taken individually. This value is stored and the operation passes to the next macroblock which has not been previously encoded, either alone or in a large block, in the macroblock scanning order. This is the macroblock 2.

When the current macroblock is the macroblock 2, the best base representation is obtained from the encoding of the large block sized 32×32, comprising the macroblocks 2, 3, 5 and 6. This value is stored and the operation passes to the next macroblock which has not been previously encoded. This is the macroblock 4.

When the current macroblock is the macroblock 4, the best base representation is obtained from the macroblock 4. This value is stored and the operation passes to the next macroblock which has not been previously encoded. This is the macroblock 7. And so on and so forth.

Thus, in this example, the best base representation of the macroblocks 1, 4, 7, 8 and 9 respectively is obtained from the macroblocks 1, 4, 7, 8 and 9 and the best base representation of the macroblock 2 is obtained from a large block sized 32×32 comprising the macroblocks 2, 3, 5 and 6.

The signal therefore comprises the following data in the following order:

base encoding information associated with the macroblock 1 (MB 16×16 (1));

base encoding information associated with the large block comprising the macroblocks 2, 3, 5, and 6 (MB 32×32 (2));

base encoding information associated with the macroblock 4 (MB 16×16 (4));

base encoding information associated with the macroblock 7 (MB 16×16 (7));

base encoding information associated with the macroblock 8 (MB 16×16 (8));

base encoding information associated with the macroblock 9 (MB 16×16 (9)).

FIG. 5 provides a more precise illustration of the syntax of such a stream.

It can thus be seen that the macroblocks 3, 5 and 6 are not encoded individually in their base version (i.e. they do not reveal any specific base encoding information). In other words, since the best base representation of the current macroblock 2 is obtained from the large block sized 32×32 comprising the macroblocks 2, 3, 5 and 6, the macroblocks 3, 5 and 6 are skipped during the scanning of the macroblocks of the image and no additional base encoding information is encoded for the neighboring macroblocks (macroblocks 3, 5 and 6) situated in the zone rebuilt by the current macroblock (macroblock 2).

This simplifies the encoding of a big zone of the image in limiting the number of pieces of encoded data.

Furthermore, for one or more macroblocks of the zone rebuilt by a large block, information on enhancement of texture and/or motion can be encoded in order to improve the quality of these macroblocks. Enhancement information is then encoded following the base encoding information of the large block in the form of residues and in the scan order used for scanning the macroblocks.

FIG. 6 provides a more precise illustration of the syntax associated with the stream comprising enhancement information for the macroblocks of the large block 32×32 of the example of FIG. 4, in considering the enhancement information to be encoded for each macroblock 2, 3, 5 and 6.

As illustrated in FIG. 6, the signal then comprises the following pieces of data in the following order:
- base encoding information associated with the macroblock 1 (16×16 MB (1));
- base encoding information associated with the large block comprising the macroblocks 2, 3, 5, and 6 (32×32 MB (2));
- enhancement information associated with the macroblock 2 (MB 16×16_E (2));
- enhancement information associated with the macroblock 3 (MB 16×16_E (3));
- base encoding information associated with the macroblock 4 (MB 16×16 (4));
- enhancement information associated with the macroblock 5 (MB 16×16_E (5));
- enhancement information associated with the macroblock 6 (MB 16×16_E (6));
- base encoding information associated with the macroblock 7 (MB 16×16 (7));
- base encoding information associated with the macroblock 8 (MB 16×16 (8));
- base encoding information associated with the macroblock 9 (MB 16×16 (9)).

It can be noted that the pieces of enhancement information associated with a macroblock of a large block are inserted in the order of scanning of the macroblocks of the image. They are thus retrieved mixed with base encoding information associated with the large block and with base encoding information associated with other macroblocks, in the order of scanning of the macroblocks of the image.

3. Modification of the Syntax

Here below, we present examples of modification of syntax for an AVC-based compression scheme.

The images of a sequence are deemed to be sub-divided into slices which are then sub-divided into macroblocks.

A) Slice Header Syntax

The header of a slice is modified in order to signal the presence or absence of the enhancement information.

In other words, a flag is provided to signal the presence of pieces of enhancement information associated with at least one macroblock present in a large block. For example, a flag known "extra_macroblock_flag" is inserted in the header to signal the presence of enhancement information for one or more macroblocks already encoded through a large block in the base version (i.e. macroblocks for which base encoding information has already been determined).

The appendix A, which is an integral part of the present description, proposes an example of header syntax corresponding to a slice in which the "extra_macroblock_flag" inserted in the stream according to an embodiment of the invention is shown in italics. The semantics associated with this syntax is described more specifically in the H.264/AVC standard.

B) Syntax of the "Slice Data Syntax" Payload Part

The appendix B, which is also an integral part of the present description proposes an example of syntax of the payload part comprising the pieces of information pertaining to a slice (base encoding information and possibly enhancement information) in which the elements inserted into the stream according to an embodiment of the invention are shown in italics. The slashed element corresponds to a line of the existing syntax according to the H.264 standard which has been modified according to an embodiment of the invention.

The semantics associated with this syntax are described more specifically in the H.264/AVC standard, and especially in the ITU-T H.264 recommendation (section 7, more specifically 7.3 for the syntax and 7.4 for the semantics).

More specifically, in this example of implementation, the following steps are implemented macroblock by macroblock in the macroblock encoding scan order:
- first of all a test is made to see if the current macroblock has already been encoded (i.e. if base encoding information has already been obtained for this macroblock), using for example a function known as the "macroblock_coded" function;
- if the current macroblock has not already been encoded:
  - a flag is inserted to signal the presence or non-presence of a block with a size greater than that of a macroblock, for this current macroblock (super_block_flag);
  - if a large block is built, the large block is encoded and base encoding information associated with the large block is obtained (in using for example a function known as the "super_block_layer");
  - else, the current macroblock is encoded classically and base encoding information associated with the macroblock is obtained (by using for example the "macroblock_layer" function);
- else, if the current macroblock has already been decoded (i.e. through a large block which overlaps it), a check is made to see if it is possible to encode additional enhancement information for this macroblock (in taking account of the value of an "extra_macroblock_flag" indicator encoded at the slice header for example). If this is the case (for example if "extra_macroblock_flag=1"), then enhancement information associated with the current macroblock is encoded (in making use of the "macroblock_enhancement_layer" function).

The functions known as "super_block_layer", "macroblock_enhancement_layer" and "macroblock_coded" work as follows:
- the super_block_layer function is similar in its principle to the macroblock_layer function of the H.264 standard: it defines the representation parameters related to a predictive code of a block by means of an intra or inter prediction, with possible sub-division, using transformation and quantification of the prediction residue;
- the macroblock_enhancement function defines the enhancement parameters (for example motion residue, texture residue) to be provided to the base representation information elements similarly to what is done by the SVC extension of AVC;
- the macroblock_coded function controls the state of information on existence of a base representation preliminarily defined for a macroblock. This operation is done through the state of the values of an information map defining the macroblocks having a base representation available. This information map is updated during the encoding of a large block in the decoding processing operation associated with the super_block_layer function.

It can be noted that, according to this syntax, it is possible to insert a flag specifying that there is no enhancement to be encoded for at least one macroblock of a large block, through the "super_block_layer" function. In this case, the "macroblock_enhancement_layer" function has no effect on the macroblock considered.

4. Detailed Description of the Decoding Method

Figure 7:
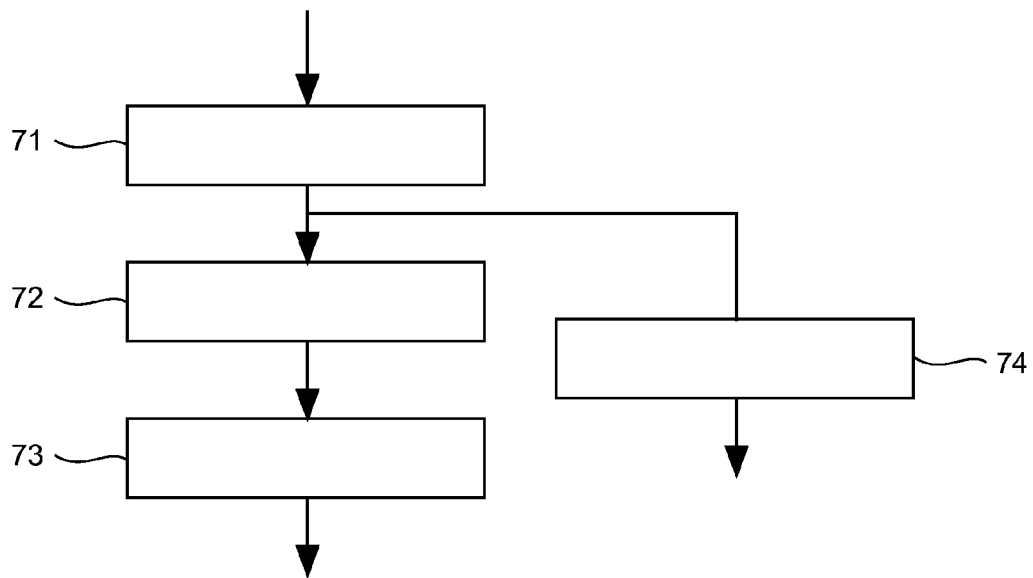
FIG. 7 illustrates the main steps of a method of decoding according to one embodiment of the invention.

Referring now to FIG. 7, we present the main steps of the decoding method according to one embodiment of the invention.

At reception of a signal representing a sequence of images encoded according to an embodiment of the invention, comprising base encoding information associated with one or more large blocks, and enhancement information associated with at least one macroblock present in one of the large blocks, a decoder implements the following steps:
- reading 71 base encoding information associated with the large block;
- decoding 72 base encoding information and rebuilding of the large block;
- decoding 73 the enhancement information associated with the macroblocks of the large block, if they exist, and associated refining of at least one macroblock present in the large block.

An additional step 74 for decoding base encoding information associated with a macroblock and rebuilding of the macroblock can also be planned if the received signal carries base encoding information associated with one or more macroblocks.

The decoding method according to an embodiment of the invention can be implemented in many ways, especially in wired form or in software form.

According to one example of implementation, the decoder reads the information of the stream for the image to be decoded macroblock by macroblock and stores the information for each macroblock.

During the reading of the information in the stream, if a current macroblock is encoded by a large block, the decoder reads the base encoding information associated with the large block. By contrast, it does not read any base encoding information associated with the other macroblocks present in the large block, i.e. the horizontal and/or vertical macroblocks neighboring the current macroblock. If the enhancement information is present for one or more macroblocks of the large block, this information is read and stored.

More specifically, at the reading of the information associated with a macroblock, the number of base encoding coefficients to be read for this macroblock is determined by the size of the large block, its partitioning and the type of transform used. These three pieces of information are read in the stream or deduced from previously read base encoding information.

A macroblock or a large block is then rebuilt classically by means of the entropic decoding of the coefficients, inverse quantification and inverse transform. A prediction is then computed for the macroblock or the large block and added to the rebuilt residue. The zone of the image corresponding to the macroblock or to the large block is then rebuilt.

5. Structure of the Encoding and Decoding Devices

Figure 8:
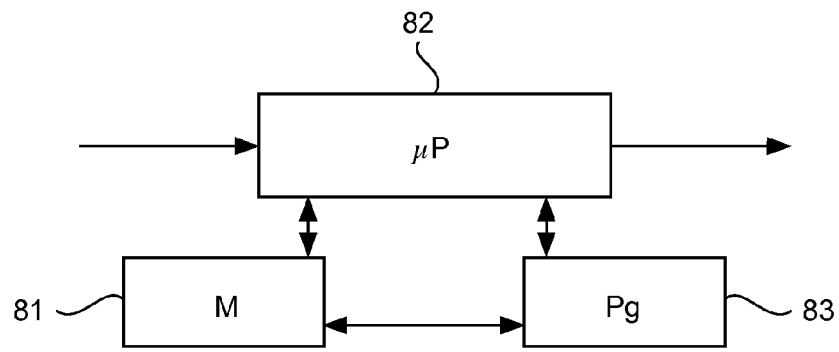
FIGS. 8 and 9 respectively present the structure of an encoding device and a decoding device implementing an encoding technique and a decoding technique according to one particular embodiment of the invention.
Figure 9:
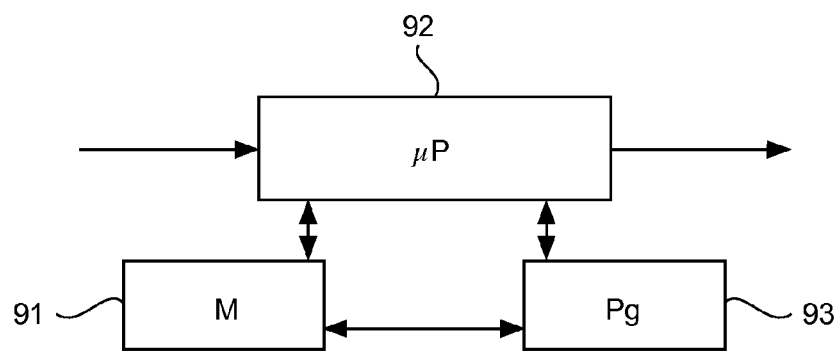

Finally, referring to FIGS. 8 and 9, a simplified structure is presented of an encoder and a decoder respectively implementing a technique for encoding an image sequence and a decoding technique according to the particular embodiment described here above.

Such an encoding device comprises a memory 81 comprising a buffer memory, a processing unit 82 equipped for example with a microprocessor µP and driven by the computer program 83, implementing the encoding method according to an embodiment of the invention.

At initialization, the code instructions of the computer program 83 are for example loaded into a RAM and then executed by the processor of the processing unit 82. The processing unit 82 inputs one or more images of a sequence to be encoded. The microprocessor of the processing unit 82 implements the steps of the encoding method described here above according to the computer program instructions 83 to encode the image or images in a signal. To this end, the encoder comprises, in addition to the buffer memory 81, means for sub-dividing an image into standard-sized blocks, known as macroblocks, means for building at least one block of a size greater than that of a current macroblock, means for encoding a large block and means for determining enhancement information associated with at least one macroblock present in the large block. These means are driven by the microprocessor of the processing unit 82.

The decoder illustrated in FIG. 9 comprises a memory 91 comprising a buffer memory, a processing unit 92 equipped for example with a microprocessor µP and driven by the computer program 93 implementing the decoding method according to one embodiment of the invention.

At initialization, the code instructions of the computer program 93 are for example loaded into a RAM and then executed by the processor of the processing unit 92. The processing unit 92 inputs a signal representing a sequence of images. The microprocessor of the processing unit 92 implements the steps of the decoding method described here above according to the instructions of the computer program 93 to decode the signal and rebuild the image or images of the sequence. To this end, the decoder comprises, in addition to the buffer memory 91, means for reading base encoding information, means for decoding base encoding information and rebuilding said large block and means for decoding enhancement information associated with a large block and refining at least one macroblock present in the large block. These means are driven by the microprocessor of the processing unit 92.

6. Appendix A

| slice_header( ) { | C | Descriptor |
|---|---|---|
|   first_mb_in_slice | 2 | ue(v) |
|   slice_type | 2 | ue(v) |
|   pic_parameter_set_id | 2 | ue(v) |
|   extra_macroblock_flag | 2 | u(1) |
|   if( separate_colour_plane_flag = = 1 ) | | |
|     colour_plane_id | 2 | u(2) |
|   frame_num | 2 | u(v) |
|   if( !frame_mbs_only_flag ) { | | |
|     field_pic_flag | 2 | u(1) |
|     if( field_pic_flag ) | | |
|       bottom_field_flag | 2 | u(1) |
|   } | | |

| slice_header( ) { | C | Descriptor |
|---|---|---|
|   if( nal_unit_type = = 5 ) | | |
|     idr_pic_id | 2 | ue(v) |
|   if( pic_order_cnt_type = = 0 ) { | | |
|     pic_order_cnt_lsb | 2 | u(v) |
|     if( pic_order_present_flag && !field_pic_flag ) | | |
|       delta_pic_order_cnt_bottom | 2 | se(v) |
|   } | | |
|   if( pic_order_cnt_type = = 1 && !delta_pic_order_always_zero_flag ) { | | |
|     delta_pic_order_cnt[ 0 ] | 2 | se(v) |
|     if( pic_order_present_flag && !field_pic_flag ) | | |
|       delta_pic_order_cnt[ 1 ] | 2 | se(v) |
|   } | | |
|   if( redundant_pic_cnt_present_flag ) | | |
|     redundant_pic_cnt | 2 | ue(v) |
|   if( slice_type = = B ) | | |
|     direct_spatial_mv_pred_flag | 2 | u(1) |
|   if( slice_type = = P || slice_type = = SP || slice_type = = B ) { | | |
|     num_ref_idx_active_override_flag | 2 | u(1) |
|     if( num_ref_idx_active_override_flag ) { | | |
|       num_ref_idx_l0_active_minus1 | 2 | ue(v) |
|       if( slice_type = = B ) | | |
|         num_ref_idx_l1_active_minus1 | 2 | ue(v) |
|     } | | |
|   } | | |
|   ref_pic_list_reordering( ) | 2 | |
|   if( ( weighted_pred_flag && ( slice_type = = P || slice_type = = SP ) ) || | | |
|     ( weighted_bipred_idc = = 1 && slice_type = = B ) ) | | |
|     pred_weight_table( ) | 2 | |
|   if( nal_ref_idc != 0 ) | | |
|     dec_ref_pic_marking( ) | 2 | |
|   if( entropy_coding_mode_flag && slice_type != I && slice_type != SI ) | | |
|     cabac_init_idc | 2 | ue(v) |
|   slice_qp_delta | 2 | se(v) |
|   if( slice_type = = SP || slice_type = = SI ) { | | |
|     if( slice_type = = SP ) | | |
|       sp_for_switch_flag | 2 | u(1) |
|     slice_qs_delta | 2 | se(v) |
|   } | | |
|   if( deblocking_filter_control_present_flag ) { | | |
|     disable_deblocking_filter_idc | 2 | ue(v) |
|     if( disable_deblocking_filter_idc != 1 ) { | | |
|       slice_alpha_c0_offset_div2 | 2 | se(v) |
|       slice_beta_offset_div2 | 2 | se(v) |
|     } | | |
|   } | | |
|   if( num_slice_groups_minus1 > 0 && | | |
|     slice_group_map_type >= 3 && slice_group_map_type <= 5 ) | | |
|     slice_group_change_cycle | 2 | u(v) |
| } | | |

45

7. Appendix B

| slice_data( ) { | C | Descriptor |
|---|---|---|
|   if( entropy_coding_mode_flag ) | | |
|     while( !byte_aligned( ) ) | | |
|       cabac_alignment_one_bit | 2 | f(1) |
|   CurrMbAddr = first_mb_in_slice * ( 1 + MbaffFrameFlag ) | | |
|   moreDataFlag = 1 | | |
|   prevMbSkipped = 0 | | |
|   do { | | |
|     if( slice_type != I && slice_type != SI ) | | |
|       if( !entropy_coding_mode_flag ) { | | |
|         mb_skip_run | 2 | ue(v) |
|         prevMbSkipped = ( mb_skip_run > 0 ) | | |
|         for( i=0; i<mb_skip_run; i++ ) | | |
|           CurrMbAddr = NextMbAddress( CurrMbAddr ) | | |
|         moreDataFlag = more_rbsp_data( ) | | |
|       } else { | | |
|         mb_skip_flag | 2 | ae(v) |
|         moreDataFlag = !mb_skip_flag | | |
|       } | | |
|     if( moreDataFlag ) { | | |
|       if( MbaffFrameFlag && ( CurrMbAddr % 2 = = 0 || | | |

-continued

| slice_data( ) { | C | Descriptor |
|---|---|---|
|     ( CurrMbAddr % 2 = = 1 && prevMbSkipped ) ) ) | | |
|       mb_field_decoding_flag | 2 | u(1) \| ae(v) |
|     if( !macroblock_coded( ) ) { | | |
|       super_bloc_flag | 2 | u(1) |
|       if( super_bloc_flag ) | | |
|         Super_bloc_layer( ) | | |
|       Else | | |
|         macroblock_layer( ) | 2\|3\|4 | |
|     } else { | | |
|       if( extra_macroblock_flag ) | | |
|         macroblock_enhancement_layer( ) | | |
|     } | | |
|     ~~macroblock_layer()~~ | ~~2\|3\|4~~ | |
| } | | |
| if( !entropy_coding_mode_flag ) | | |
|   moreDataFlag = more_rbsp_data( ) | | |
| else { | | |
|   if( slice_type != I && slice_type != SI ) | | |
|     prevMbSkipped = mb_skip_flag | | |
|   if( MbaffFrameFlag && CurrMbAddr % 2 = = 0 ) | | |
|     moreDataFlag = 1 | | |
|   else { | | |
|     end_of_slice_flag | 2 | ae(v) |
|     moreDataFlag = !end_of_slice_flag | | |
|   } | | |
| } | | |
| CurrMbAddr = NextMbAddress( CurrMbAddr ) | | |
| } while( moreDataFlag ) | | |
| } | | |

Although the present disclosure has been described with reference to one or more examples, workers skilled in the art will recognize that changes may be made in form and detail without departing from the scope of the disclosure and/or the appended claims.

The invention claimed is:

1. A method for encoding a sequence of images comprising the following acts performed by an encoding device:
sub-dividing a current image into standard-sized blocks known as macroblocks,
for at least one current macroblock of said current image, the following acts:
building at least one block of a size greater than said current macroblock, called a large block, comprising said current macroblock and at least one neighboring macroblock in said current image, in taking account of characteristics of said current image; and
encoding said large block with a single set of base encoding coefficients obtained only from said current macroblock, said single set comprising no base encoding coefficients obtained from said at least one neighboring macroblock belonging to said large block, said single set comprising a number of base encoding coefficients determined by the size of the large block, said encoding enabling rebuilding of all pixels of said large block, and
for at least one large block, determining enhancement information associated with at least one macroblock present in said large block enabling rebuilding of an enhancement layer of said current image.

2. The method of encoding according to claim 1, wherein the method comprises a preliminary act of checking if said current macroblock has been previously encoded in a large block and in the event of a positive check, passing to a following macroblock in a predetermined scanning order.

3. A method of encoding according to claim 1, wherein the method comprises insertion, into a signal representing said image sequence, of at least one flag belonging to a group consisting of:
a flag signaling the presence of at least one large block; and
a flag signaling the presence of enhancement information associated with at least one macroblock present in said large block.

4. A method of encoding according to claim 3, wherein the method comprises inserting the following pieces of information into said signal, in a predetermined order of scanning of said macroblocks in the current image:
base encoding information associated with at least one macroblock;
base encoding information associated with at least one large block; and
enhancement information associated with at least one macroblock present in a large block.

5. A non-transitory computer-readable memory comprising a computer program recorded thereon comprising instructions for implementation of an encoding method for encoding a sequence of images when this program is executed by a processor, wherein the method comprises:
sub-dividing a current image into standard-sized blocks known as macroblocks,
for at least one current macroblock of said current image:
building at least one block of a size greater than said current macroblock, called a large block, comprising said current macroblock and at least one neighboring macroblock in said current image, in taking account of characteristics of said current image; and
encoding said large block, delivering a single set of base encoding coefficients obtained only from said current macroblock, said single set comprising no base encoding coefficients obtained from said at least one neighboring macroblock belonging to said large block, said single set comprising a number of base encoding coefficients determined by the size of the large block, said encoding enabling rebuilding of all pixels of said large block, and for at least one large block, determining enhancement information associated with at least one macroblock present in said large block enabling rebuilding of an enhancement layer of said current image.

6. A device for encoding a sequence of images, wherein the device comprises:

means for sub-dividing a current image into standard-sized blocks known as macroblocks, for at least one current macroblock of the current image:

means for building at least one block of a size greater than said current macroblock, called a large block, comprising said current macroblock and at least one neighboring macroblock in the current image, in taking account of characteristics of said current image; and means for encoding said large block delivering a single set of base encoding coefficients obtained only from said current macroblock, said single set comprising no base encoding coefficients obtained from said at least one neighboring macroblock belonging to said large block, said single set comprising a number of base encoding coefficients determined by the size of the large block, said encoding enabling rebuilding of all pixels of said large block; and for at least one large block, means for determining enhancement information associated with at least one macroblock present in said large block enabling rebuilding of an enhancement layer of said current image.

7. A method comprising:

generating with an encoding device a signal representing a sequence of images encoded according to a method comprising:

sub-dividing a current image into standard-sized blocks known as macroblocks, for at least one current macroblock of said current image:

building at least one block of a size greater than said current macroblock, called a large block, comprising said current macroblock and at least one neighboring macroblock in said current image, in taking account of characteristics of said current image; and encoding said large block, delivering a single set of base encoding coefficients obtained only from said current macroblock, said single set comprising no base encoding coefficients obtained from said at least one neighboring macroblock belonging to said large block, said single set comprising a number of base encoding coefficients determined by the size of the large block, said encoding enabling rebuilding of all pixels of said large block, and for at least one large block, determining enhancement information associated with at least one macroblock present in said large block enabling rebuilding of an enhancement layer of said current image, wherein the signal comprises:
the base encoding coefficients; and
the enhancement information.

8. A method for decoding a signal representing a sequence of images, an image being sub-divided into standard-sized blocks known as macroblocks, said signal comprising, for a current image:

a single set of base encoding coefficients associated with at least one large block, enabling rebuilding of all pixels of the large block, the large block corresponding to a group of macroblocks built in taking account of characteristics of said current image and comprising a current macroblock and at least one neighboring macroblock in the current image, said single set of base encoding coefficients being obtained only from the current macroblock, and said single set comprising no base encoding coefficients obtained from said at least one neighboring macroblock belonging to said large block, said single set comprising a number of base encoding coefficients determined by the size of the large block, said encoding; and enhancement information associated with at least one macroblock present in at least one of said at least one large block, enabling rebuilding of an enhancement layer of said current image, wherein said method implements the following acts performed by a decoding device:

reading said single set of base encoding coefficients associated with said large block;

decoding said single set of base encoding coefficients and rebuilding said large block;

decoding enhancement information associated with at least one macroblock present in said large block, if this information exists, and refining said at least one macroblock.

9. The method of decoding according to claim 8, wherein the method comprises rebuilding a macroblock out of at least one macroblock present in a previously rebuilt large block.

10. The method of decoding according to claim 8, wherein refining is done according to a predetermined order of scanning of the macroblocks.

11. A non-transitory computer-readable memory comprising instructions for implementation of decoding a signal representing a sequence of images, an image being sub-divided into standard-sized blocks known as macroblocks, when this program is executed by a processor, wherein said signal comprises for a current image:

a single set of base encoding coefficients associated with at least one large block, enabling rebuilding of all pixels of the large block, the large block corresponding to a group of macroblocks built in taking account of characteristics of said current image and comprising a current macroblock and at least one neighboring macroblock in the current image, said single set of base encoding coefficients being obtained only from the current macroblock, and said single set comprising no base encoding coefficients obtained from said at least one neighboring macroblock belonging to said large block, said single set comprising a number of base encoding coefficients determined by the size of the large block, said encoding; and enhancement information associated with at least one macroblock present in at least one of said at least one large block, enabling rebuilding of an enhancement layer of said current image, and wherein said method implements the following acts:

reading said single set of base encoding coefficients associated with said large block;

decoding said single set of base encoding coefficients and rebuilding said large block; and decoding enhancement information associated with at least one macroblock present in said large block, if this information exists, and refining said at least one macroblock.

12. A device for decoding a signal representing a sequence of images, an image being sub-divided into standard-sized blocks called macroblocks, said signal comprising for a current image:

a single set of base encoding coefficients associated with at least one large block, enabling rebuilding of all pixels of said large block, the large block corresponding to a group of macroblocks built in taking account of characteristics of said current image and comprising a current macroblock and at least one neighboring macroblock in the current image, said single set of base encoding coefficients being obtained only from the current macroblock, and said single set comprising no base encoding coefficients obtained from said at least one neighboring macroblock belonging to said large block, said single set comprising a number of base encoding coefficients determined by the size of the large block, said encoding; and enhancement information associated with at least one macroblock present in one of said at least one large block, enabling rebuilding of an enhancement layer of said current image;

wherein said device comprises:

means for reading said single set of base encoding coefficients associated with said large block;

means for decoding said single set of base encoding coefficients and rebuilding said large block; and means for decoding enhancement information associated with at least one macroblock present in said large block, if this information exists, and for refining said at least one macroblock.

13. A method for encoding a sequence of images comprising the following acts performed by an encoding device:

sub-dividing a current image into standard-sized blocks known as macroblocks, for at least one current macroblock of said current image, the following acts:

building at least one block of a size greater than said current macroblock, called a large block, comprising said current macroblock and at least one neighboring macroblock in said current image, in taking account of characteristics of said current image; and encoding said large block, delivering a single set of base encoding coefficients associated to said large block, said single set comprising a number of base encoding coefficients determined by the size of the large block, said encoding enabling rebuilding of a base layer of said current image, and for at least one large block, determining enhancement information associated with at least one macroblock present in said large block enabling rebuilding of an enhancement layer of said current image, and a preliminary act of checking if said current macroblock has been previously encoded in a large block and in the event of a positive check, passing to a following macroblock in a predetermined scanning order.

* * * * *